Aug. 4, 1959

W. P. CANEPA 2,897,922

DOUBLE LINED BRAKES FOR VEHICLES

Filed Oct. 23, 1957

INVENTOR.
WILLIAM P. CANEPA
BY
ATTORNEY

Aug. 4, 1959     W. P. CANEPA     2,897,922
DOUBLE LINED BRAKES FOR VEHICLES
Filed Oct. 23, 1957     2 Sheets-Sheet 2
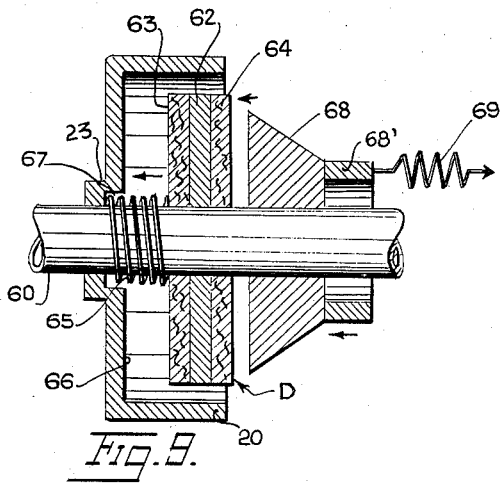
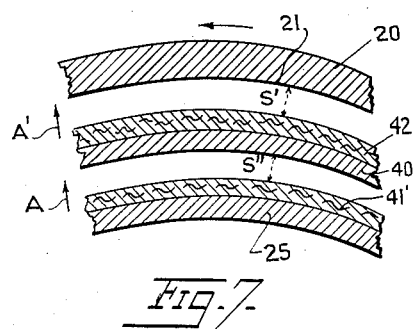
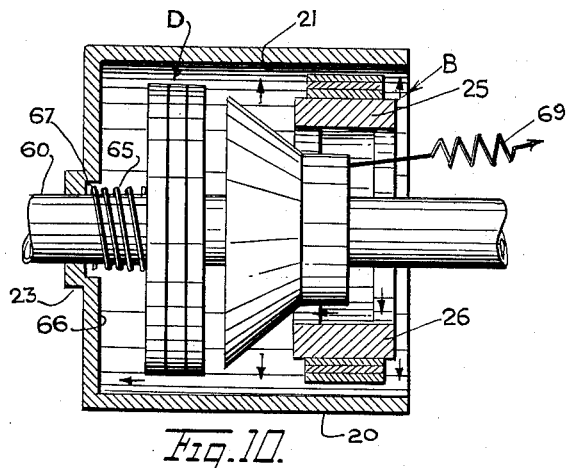
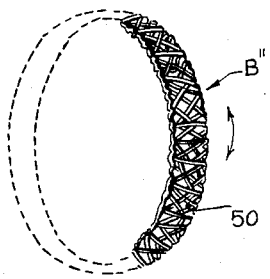
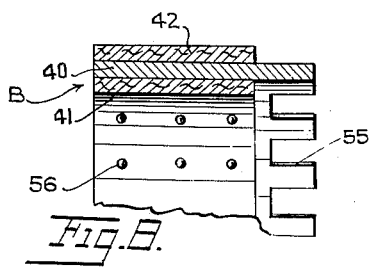
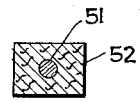
INVENTOR.
WILLIAM P. CANEPA
BY
*ATTORNEY*

2,897,922
DOUBLE LINED BRAKES FOR VEHICLES
William P. Canepa, Bronx, N.Y., assignor of one-fourth to Mary Martin, New York, N.Y.

Application October 23, 1957, Serial No. 691,869

2 Claims. (Cl. 188—70)

This invention relates to the art of automotive friction brakes and particularly concerns a clinging but loosely fitting brake lining structure for use with the brake shoes and drums of a friction brake assembly.

In a conventional brake assembly, a plurality of brake shoes are located within a rotatable drum. The shoes have friction linings which press radially against the drum to stop rotation thereof when the brake is operated. The linings are rigidly attached to the brake shoe which are mechanically forced against the drum. It has been found in practice rather difficult to maintain equal spacing between all of the shoes and the brake drum in order to apply equal braking effort. Failure to maintain equalization of the brake shoes causes the brake drums to be worn into elliptical shapes. Binding and unbalanced operation of the brakes of a vehicle result.

It is an object of the invention to overcome the difficulties and disadvantages of prior friction brakes and obtain increased braking efficiency by doubling the braking surface area by providing a double friction lining on a disk structure, ring or band located between the brake shoes and internal circular or cylindrical surfaces of a brake drum.

It is another object to double the braking surface by providing a double lined friction inducing member for a brake assembly, whereby instability and fade are eliminated or reduced substantially by the sudden application of the brakes, to a moving vehicle and whereby the braking pressure and friction will be equally distributed on both sides of the brake lining, the force and friction involved in slowing or stopping the rotation being reduced substantially as it is distributed on the linings thereby also reducing friction temperature on the brake linings.

A further object is to provide a brake construction including a spinning drum and brake shoe wherein when the spinning drum comes suddenly into contact with the brake shoe, resultant drag on the free end of the shoe pulls the shoe outwardly forcing closer contact with the drum and increasing the braking power on wheels whose linings have been worn.

It is a further object to provide an expansible and contractible clinging and loosely fitting friction band for a brake.

In one form of the invention the clinging and loosely fitting friction member is a ring or band of spring steel with friction inducing linings applied to opposite surfaces thereof. In another form of the invention the band is formed from strands of interwoven steel wire coated or covered with friction inducing material. The invention may be embodied in a disk structure or plate adapted to slide on an axle in a brake drum with the friction lining applied to opposite sides of the disk.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 5 is a perspective view of another modified form of brake band.

Fig. 6 is a sectional view of one strand of the brake band of Fig. 5.

Fig. 7 is a sectional view of a portion of a brake drum, shoe, and brake band.

Fig. 8 is a fragmentary sectional view of another form of movable brake band.

Fig. 9 is a sectional view of a disk type of brake assembly embodying the invention.

Fig. 10 is a sectional view of another modified brake assembly including both a movable disk structure and movable band.

Figure 1:
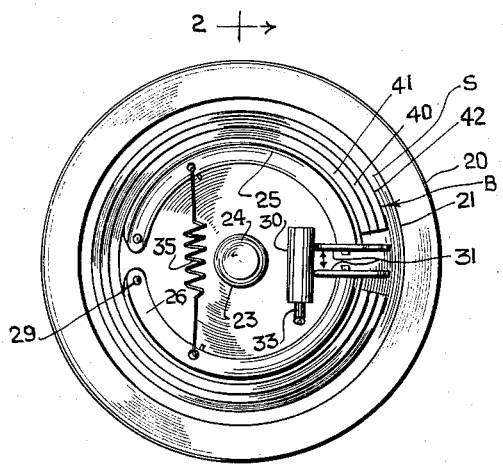
Fig. 1 is an elevational view of a brake drum showing internal parts embodying the invention.
Figure 2:
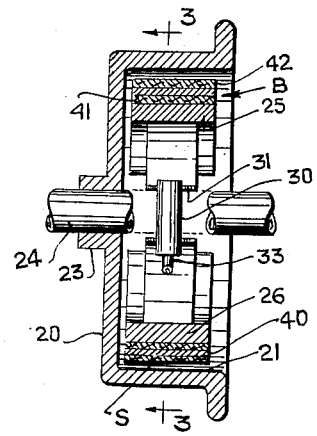
Fig. 2 is a sectional view taken on lines 2—2 of Fig. 1.
Figure 3:
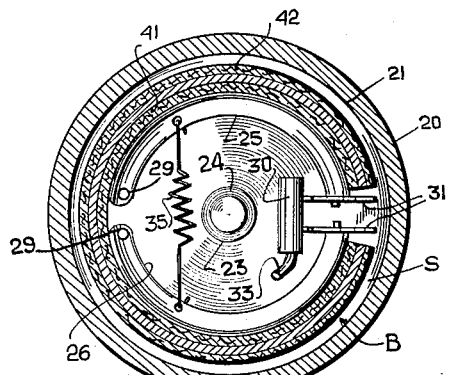
Fig. 3 is a sectional view taken on lines 3—3 of Fig. 2.

Referring to Figs. 1, 2 and 3 there is shown a brake drum 20 having a smooth inner cylindrical surface 21. Centrally disposed on the drum is a sleeve or nipple 23 adapted to receive an axle 24 upon which the brake drum may be rotated. Mounted within the drum is a pair of arcuate metal brake shoes 25 and 26. The shoes are pivotally attached at one end to pintles 29. A hydraulic cylinder 30 is disposed in a stationary position within the brake drum. This cylinder has outwardly extending arms 31 which are operatively engaged with the free ends of shoes 25, 26. A pipe 33 supplies brake fluid from a remote source to the brake cylinder for actuating the brake shoes. A coil spring 35 is attached at its opposite ends to intermediate points of the brake shoes in order to maintain the shoes in a retracted position.

Concentrically disposed within the drum 20 is a transversely split cylindrical band B. This band includes a ring 40 which is preferably made of a resilient metal such as spring steel or an alloy thereof. On opposite sides of the ring are secured a pair of heat resistant friction linings 41 and 42. The band is not attached to the shoes but clings and loosely fits thereon and moves relative thereto. In the embodiment shown in Figs. 1, 2 and 3 the expansible ring B rests on the outer flanged surfaces of the shoes. Arms 31 extend beyond the separated ends of the band B to limit angular rotation of the band on the brake shoes. When the brake is actuated by forcing fluid into cylinder 30 the shoes 25 and 26 move outwardly to press against lining 41.

Band B responds by flexing and expanding to apply friction lining 42 against the surface 21 from which it is normally spaced as indicated by the annular space S.

It will thus be apparent that there have been provided double friction surfaces between the brake shoes and the drum interior surface 21. This is twice as much friction brake surface provided as is normally found in conventional brakes where the brake linings are directly and rigidly attached to the brake shoes. In the present construction equalization of brake pressure is instantly available to the entire available braking surfaces of the movable brake band even when the pressure is suddenly applied. The brake pressure and friction inducing force is equally distributed to both exterior sides of the brake band linings.

Because of the enlarged braking area of the movable band, braking temperatures are reduced which results in a longer life for the brake linings. The invention also makes it possible to use a smaller wheel than is conventional without reducing the available braking force.

Figure 4:
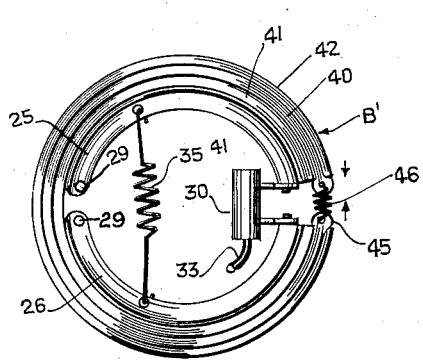
Fig. 4 is an elevational view of a modified form of brake band according to the invention.

The band B should have a sufficient inherent flexibility to withstand repeated expansions and contractions at elevated temperatures. If desired, the band may be constructed such as the band B' shown in Fig. 4 with the metal split ring 40 having enlarged ends 45 to which are secured the ends of a spring 46. The spring serves to urge the band inwardly and concentrically upon shoes 25 and 26. The band B' shown in Fig. 4 may cling to and loosely fit around the shoes, that is to say, it may be allowed to rotate relative to the brake shoes in the absence of applied braking pressure. When braking pressure is applied then lining 41 will grip the shoes 25 and 26 and lining 42 will grip the drum surface 21.

In Figs. 5 and 6 the band B" is shown in the form of an endless intermeshed or interwoven ring capable of expansion and contraction. The filament structure of the mesh is shown best in Fig. 6. It includes flat ribbon 50 having a steel core 51 enclosed in or coated with a suitable friction inducing heat resistant lining 52. This band may also be carried concentrically on shoes 25 and 26 in the same manner as bands B or B'.

In Fig. 7 is shown schematically a further variation of the clinging and loosely fit bands in which lining 42 is applied to the exterior on the surface of ring 40 while lining 41 is omitted. Instead of lining 41 there is provided a lining 41' on the exterior of the brake shoe 25. Spaces S' and S" may be maintained between lining 41' and ring 40 and between lining 42 and drum 20 or the ring may move on the lining 41' without space S". When braking pressure is applied, movement of the several members occurs as shown by the arrows A and A' to stop rotational movement of the drum 20.

In Fig. 8 the loosely clinging band B is shown provided with a plurality of fins 55 extending laterally from the inner metal ring 40. These fins serve as heat dissipating elements. The linings 41 and 42 extend up to but not over the fins. In Fig. 8 are shown rivets 56 which may be used to secure the linings 41 and 42 to the resilient ring 40. The linings may also be bonded together.

In Fig. 9 is shown a modified form of the invention in which drum 20 rotates on axle 60 extending axially therethrough. Slidably mounted upon the axle is an annular disk structure D. This disk structure has a central metal disk plate 62 on opposite sides of which are the heat resistant friction brake linings 63 and 64. A coil spring 65 sleeved around shaft 60 holds disk structure D spaced from the inner annular or circular surface 66 of the drum. A well 67 is provided in the drum face 66 to receive one end of spring 65. The spring is wholly contained in the well when fully compressed. A generally conical brake shoe 68 is arranged to slide axially on the axle 60 and force the brake lining 63 of the disk structure D against the drum surface 66. A coil spring 69 is anchored at one end to a stationary point and at its other end to the hub portion 68' of the brake shoe and holds the brake shoe 68 spaced from lining 64.

In operation of the brake structure shown in Fig. 9, a double braking action occurs between the flat surfaces of the drum and brake shoe and the adjacent friction inducing side surfaces of linings 63 and 64, respectively.

In Fig. 10 there is shown a brake structure in which a frictionally loosely clinging disk structure D and a frictionally loosely clinging cylindrical band B are both used. The disk structure D coacts with the annular flat surface 66 of the drum 20 while the expansion band B coacts with the cylindrical surface 21 of the drum.

When it is necessary to replace worn brake linings no special tools or equipment are required. Since the disk structure and band are freely removable from the brake drum these elements may be discarded and new lining disk structures or bands may be inserted in their places. It is further possible to provide a plurality of disk structures D on the axle 60 or to provide a plurality of concentrically arranged bands B, B' or B" on the brake shoes 25 and 26 if desired. The heat resistant material used for linings 41, 41', 42 and 52 may be made of a mixture of granular asbestos and silicon carbide compressed into solid mat form or other suitable materials.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. In a brake assembly, a rotatable axle, a brake drum on said axle having internal circular and cylindrical surfaces, a sliding disk structure disposed in said drum and floatingly slidable on said axle, said structure being normally spaced from the circular surface of the drum by spring means, said disk structure comprising a circular metal plate having heat resistant friction inducing linings on inner and outer surfaces thereof, a first generally conical brake shoe with a flat base disposed on the axle adjacent said disk structure and arranged to move axially on the axle to press said base against the adjacent one of said linings and to press the other one of said linings into contact with said circular surface, a brake band disposed on said axle in said drum, said band comprising a resilient generally cylindrical ring with heat resistant friction linings on inner and outer surfaces thereof, and a plurality of arcuate brake shoes pivotally disposed in the drum around the axle, said band normally clinging to and loosely fitted on said arcuate brake shoes and spaced from said cylindrical surface of the drum, said band being expansible so that when the shoes are actuated the outer lining of the band is pressed against said cylindrical surface while the inner lining of the band is contacted by said shoes.

2. In a brake assembly, a rotatable brake drum having internal circular and cylindrical surfaces, an axle extending axially through the drum, a disk structure in the drum floatingly slidable on the axle, a coil spring disposed in said drum on the axle and normally spacing the disk structure from the circular surface, said drum being formed with a well, said well wholly containing the spring when in a fully compressed condition, said disk structure comprising a circular metal plate having heat resistant friction inducing linings on opposite surfaces thereof, a first brake shoe on the axle adjacent the disk structure and arranged to move axially therein to contact the adjacent one of said linings and to press the other one of said linings into contact with said circular surface, a brake band disposed in said drum, on the axle, said band comprising a resilient generally cylindrical split metal ring with heat resistant friction linings on inner and outer surfaces thereof, and a plurality of arcuate brake shoes pivotally disposed in the drum, said band normally clinging to and being loosely fitted on said arcuate brake shoes and spaced from said cylindrical surface of the drum, said band being expansible so that when the shoes are actuated the outer lining of the band is pressed against said cylindrical surface while the inner lining of the band is contacted by said shoes.

References Cited in the file of this patent

UNITED STATES PATENTS

| | | |
|---|---|---|
| 1,395,841 | Lavoie | Nov. 1, 1921 |
| 1,532,141 | Kenyon | Apr. 7, 1925 |
| 1,729,932 | Edgerton | Oct. 1, 1929 |
| 1,741,178 | Wilson | Dec. 31, 1929 |
| 1,902,455 | La Brie | Mar. 21, 1933 |
| 1,928,059 | La Brie | Sept. 26, 1933 |
| 1,951,363 | Kopf | Mar. 20, 1934 |
| 1,986,728 | Hardy | Jan. 1, 1935 |
| 2,190,767 | Benson | Feb. 20, 1940 |
| 2,214,602 | Arnold | Sept. 10, 1940 |
| 2,797,775 | Burhans | July 2, 1957 |

FOREIGN PATENTS

| | | |
|---|---|---|
| 707,074 | Germany | June 12, 1941 |
| 25,643 | Great Britain | Nov. 13, 1906 |
| 188,099 | Switzerland | Mar. 1, 1937 |